United States Patent
Ruder et al.

(10) Patent No.: US 11,974,301 B2
(45) Date of Patent: Apr. 30, 2024

(54) LOCATION BASED FREQUENCY DOMAIN RESOURCE ALLOCATION

(71) Applicant: QUALCOMM Incorporated, San Diego, CA (US)

(72) Inventors: Michael Alexander Ruder, Pommelsbrunn (DE); Marco Papaleo, Bologna (IT)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/228,059

(22) Filed: Apr. 12, 2021

(65) Prior Publication Data

US 2022/0330224 A1    Oct. 13, 2022

(51) Int. Cl.
| H04W 72/51 | (2023.01) |
| H04W 4/40 | (2018.01) |
| H04W 72/02 | (2009.01) |
| H04W 72/0453 | (2023.01) |

(52) U.S. Cl.
CPC ............. *H04W 72/51* (2023.01); *H04W 4/40* (2018.02); *H04W 72/02* (2013.01); *H04W 72/0453* (2013.01)

(58) Field of Classification Search
CPC ..... H04W 72/048; H04W 4/40; H04W 72/02; H04W 72/0453
See application file for complete search history.

(56) References Cited

U.S. PATENT DOCUMENTS

| 2008/0026767 A1* | 1/2008 | Krstulich ............... H04W 16/14 455/452.2 |
| 2012/0069766 A1* | 3/2012 | Fu .......................... H04B 15/00 370/332 |
| 2018/0027575 A1* | 1/2018 | Shi ...................... H04W 72/048 370/336 |
| 2018/0098292 A1* | 4/2018 | Gulati ................. H04W 52/267 |
| 2018/0242313 A1* | 8/2018 | Merchlinsky ......... H04W 72/52 |
| 2018/0262266 A1* | 9/2018 | Ravishankar ......... H04W 48/04 |
| 2020/0015199 A1* | 1/2020 | Singh .................... H04L 1/1848 |
| 2020/0403761 A1* | 12/2020 | Nguyen ................ H04L 5/0094 |
| 2023/0179292 A1* | 6/2023 | Alasti .................. H04B 7/1855 370/335 |

* cited by examiner

*Primary Examiner* — Won Tae C Kim
(74) *Attorney, Agent, or Firm* — Harrity & Harrity, LLP

(57) ABSTRACT

Various aspects of the present disclosure generally relate to wireless communication. In some aspects, a wireless communication device may generate a signal for a packet using a full available frequency domain resource allocation for a channel based at least in part on a location of the wireless communication device being associated with a protected zone for interference mitigation. The wireless communication device may transmit the signal for the packet using the full available frequency domain resource allocation for the channel. Numerous other aspects are described.

30 Claims, 9 Drawing Sheets

| Coexistence Mode | Output power level limit in the ITS band (dBm EIRP) | Emissions level limit in the DSRC band (dBm/MHz EIRP) | T on time limit | T off time |
|---|---|---|---|---|
| A | ≤ 10 | ≤ -65 | No limit | No limit |
| B | ≤ 10 | ≤ -45 | ≤ 1 ms | ≥ 50 ms |
| C | ≤ 33 | ≤ -30 | ≤ 1 ms | Equation 1 |
| D | ≤ 33 | ≤ -30 | 1 ms to 7 ms | Equation 2 |

FIG. 5B

LOCATION BASED FREQUENCY DOMAIN RESOURCE ALLOCATION

FIELD OF THE DISCLOSURE

Aspects of the present disclosure generally relate to wireless communication and to techniques and apparatuses for location based frequency domain resource allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes generating a signal for a packet using a full available frequency domain resource allocation for a channel based at least in part on a location of the wireless communication device being associated with a protected zone for interference mitigation; and transmitting the signal for the packet using the full available frequency domain resource allocation for the channel.

In some aspects, a wireless communication device for wireless communication includes a memory and one or more processors, coupled to the memory, configured to: generate a signal for a packet using a full available frequency domain resource allocation for a channel based at least in part on a location of the wireless communication device being associated with a protected zone for interference mitigation; and transmit the signal for the packet using the full available frequency domain resource allocation for the channel.

In some aspects, a non-transitory computer-readable medium storing a set of instructions for wireless communication includes one or more instructions that, when executed by one or more processors of a wireless communication device, cause the wireless communication device to: generate a signal for a packet using a full available frequency domain resource allocation for a channel based at least in part on a location of the wireless communication device being associated with a protected zone for interference mitigation; and transmit the signal for the packet using the full available frequency domain resource allocation for the channel.

In some aspects, an apparatus for wireless communication includes means for generating a signal for a packet using a full available frequency domain resource allocation for a channel based at least in part on a location of the apparatus being associated with a protected zone for interference mitigation; and means for transmitting the signal for the packet using the full available frequency domain resource allocation for the channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating an example of interference mitigation in a sidelink environment, in accordance with the present disclosure.

DETAILED DESCRIPTION

Figure 1:
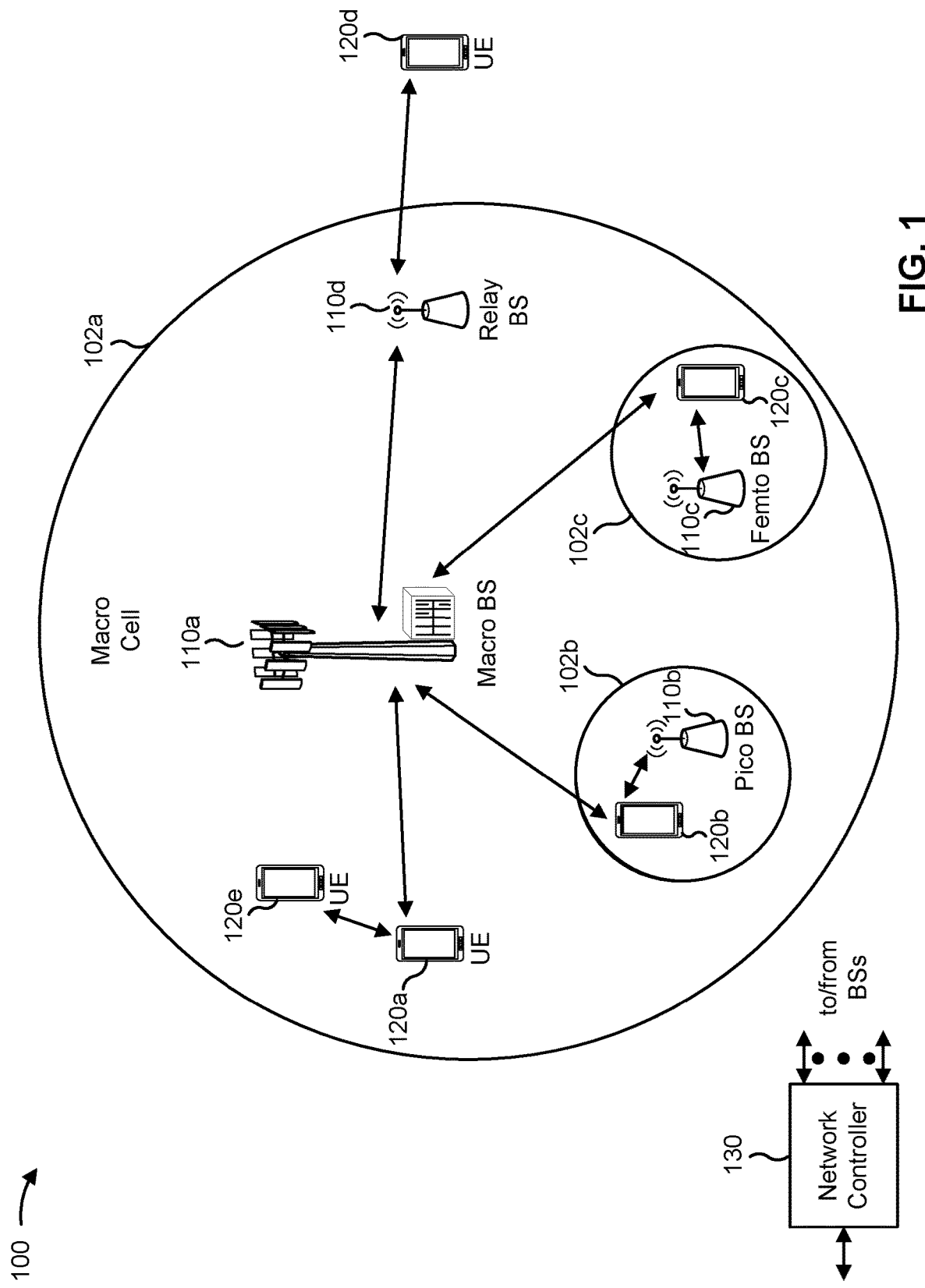
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Some of the examples in this disclosure may be based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), LTE, AMPS, or other known signals that are used to communicate within a wireless, cellular or internet of things (TOT) network, such as a system utilizing 3G, 4G or 5G, or further implementations thereof, technology.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V21) protocol), and/or a mesh network. In this case, the UE 120 may perform scheduling operations, resource selection operations, and/or other operations described elsewhere herein as being performed by the base station 110.

In some cases, wireless communication devices (e.g., UEs 120 or other devices) may communicate using one or more sidelink channels that are close in frequency with other channels. For example, UEs communicating using a V2X protocol may communicate using a frequency band that is close to (or adjacent to) a frequency band for another communication protocol, such as a dedicated short-range communications (DSRC) protocol. Therefore, interference mitigation mechanisms may be used to ensure that the communications of the UEs using the V2X protocol do not cause interference with the communications in the other frequency band.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
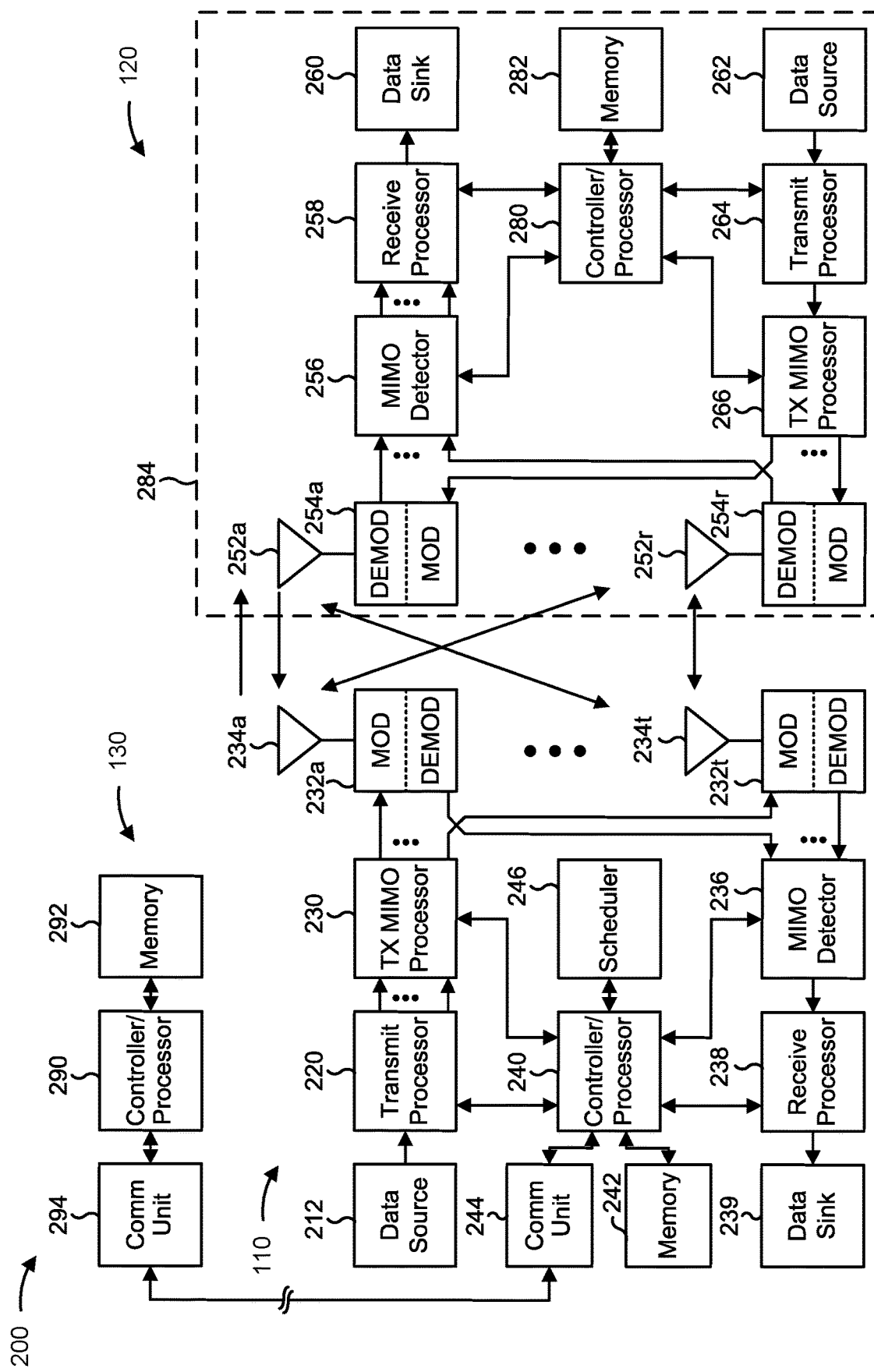
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6 and 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6 and 7).

Controller/processor 240 of base station 110, controller/processor 280 of UE 120, and/or any other component(s) of FIG. 2 may perform one or more techniques associated with location based frequency domain resource allocation, as described in more detail elsewhere herein. In some aspects, the wireless communication device described herein is the UE 120, is included in the UE 120, or includes one or more components of the UE 120 shown in FIG. 2.

Figure 7:
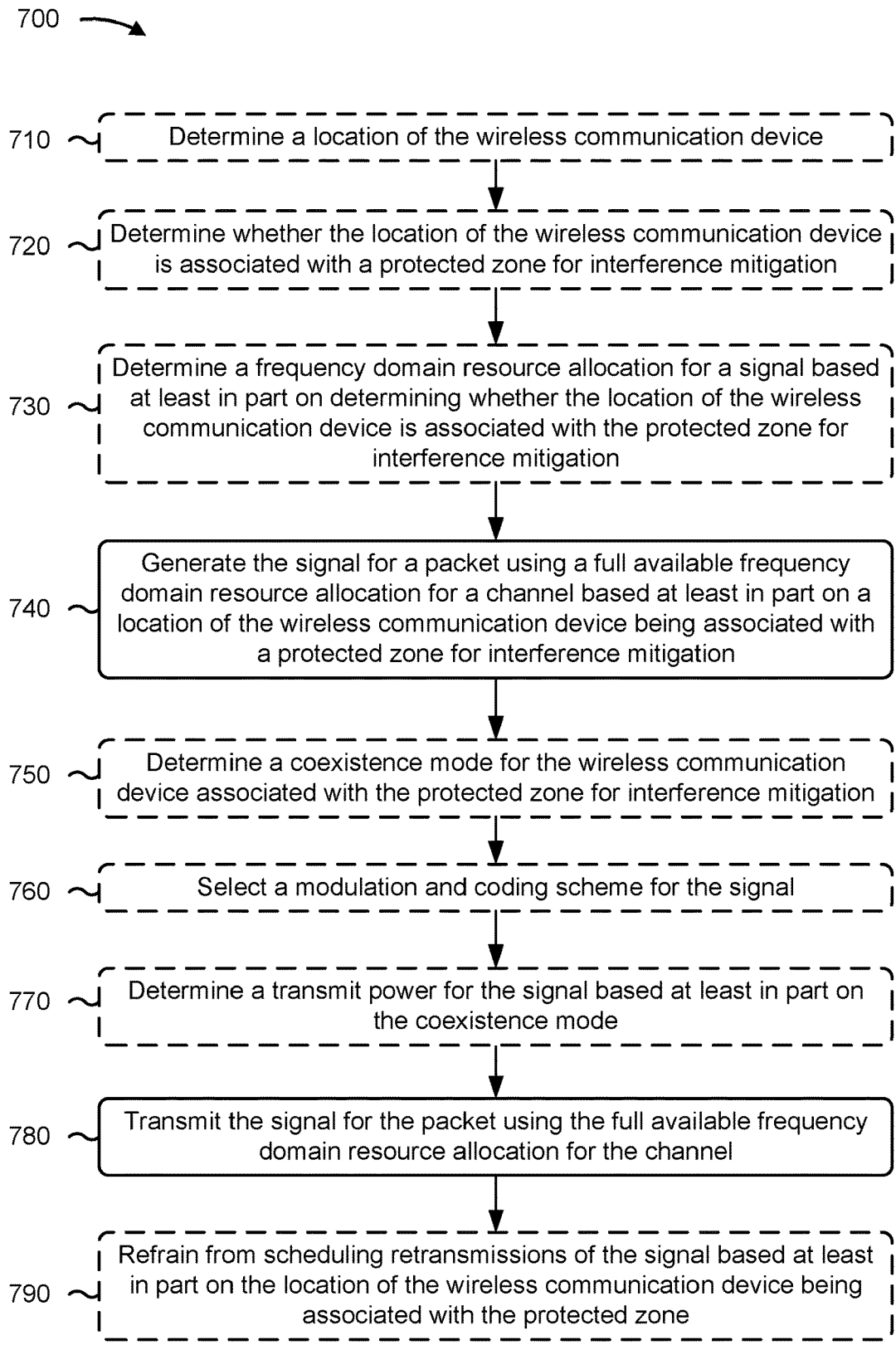
FIG. 7 is a diagram illustrating an example process associated with location based frequency domain resource allocation, in accordance with the present disclosure.

For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions, among other examples.

In some aspects, the wireless communication device (e.g., the UE 120 or another device) includes means for generating a signal for a packet using a full available frequency domain resource allocation for a channel based at least in part on a location of the wireless communication device being associated with a protected zone for interference mitigation; and/or means for transmitting the signal for the packet using the full available frequency domain resource allocation for the channel. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, and/or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
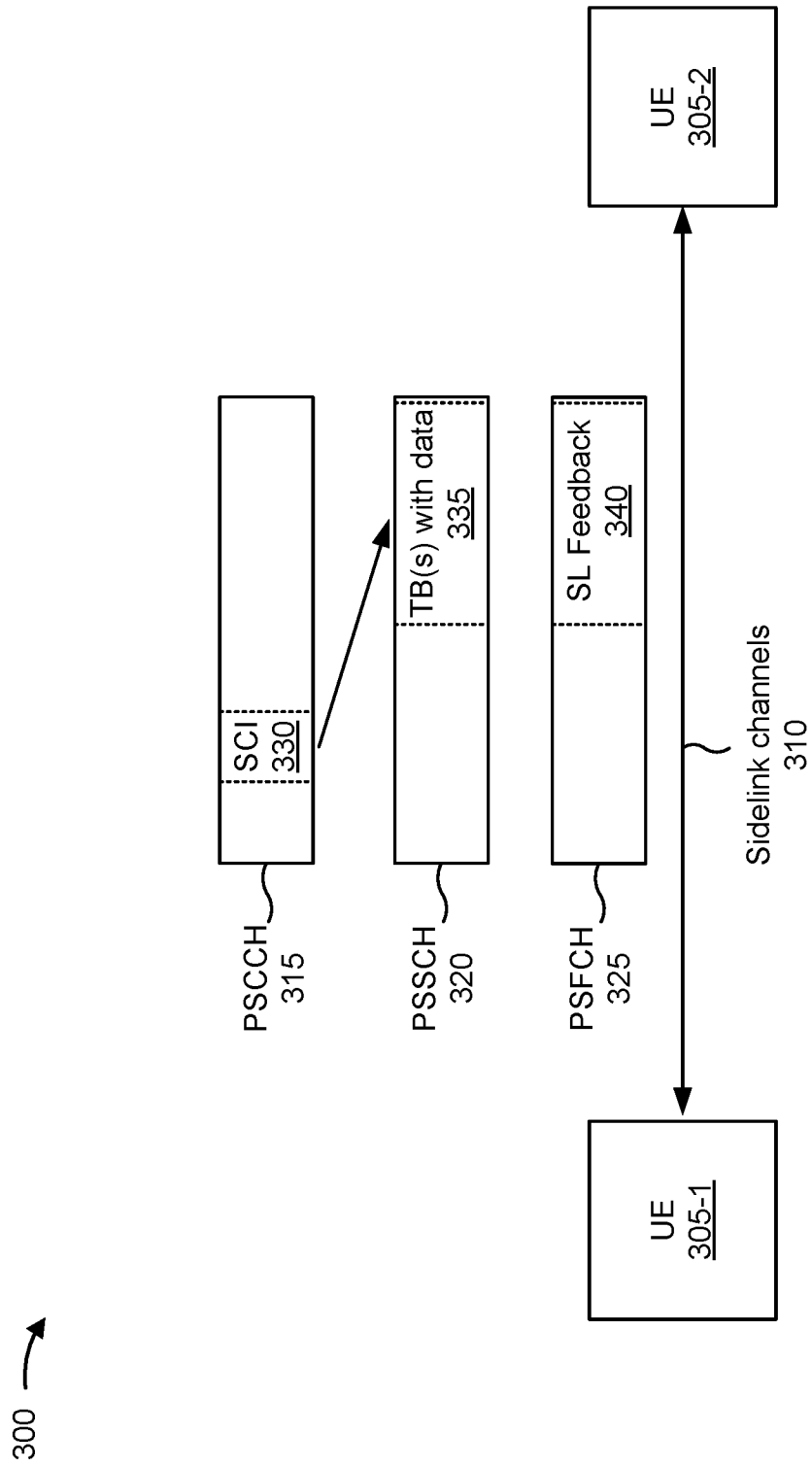
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V21 communications, and/or vehicle to pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter)

associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, a UE (e.g., the UE 305) may operate in a high frequency band (e.g., the 5.9 GHz band). For example, the high frequency band may be an intelligent transport system (ITS) band (e.g., as defined, or otherwise fixed, by a wireless communication standard, such as the 3GPP, the European telecommunications standards institute (ETSI), and/or the IEEE). The frequency band for sidelink communications (e.g., for V2X communications) may be close to, or adjacent to, another frequency band for another licensed frequency band. For example, the frequency band for sidelink communications (e.g., the ITS band) may be close to a licensed frequency band for dedicated short-range communications (DSRC) systems. As a result, in some cases, sidelink communications (e.g., V2X communications) and/or DSRC signals may cause interference with each other due to the frequency bands being close, or adjacent, in frequency, as explained in more detail below.

As indicated above, FIG. 3 is provided as an example. Other examples may differ from what is described with respect to FIG. 3.

Figure 4:
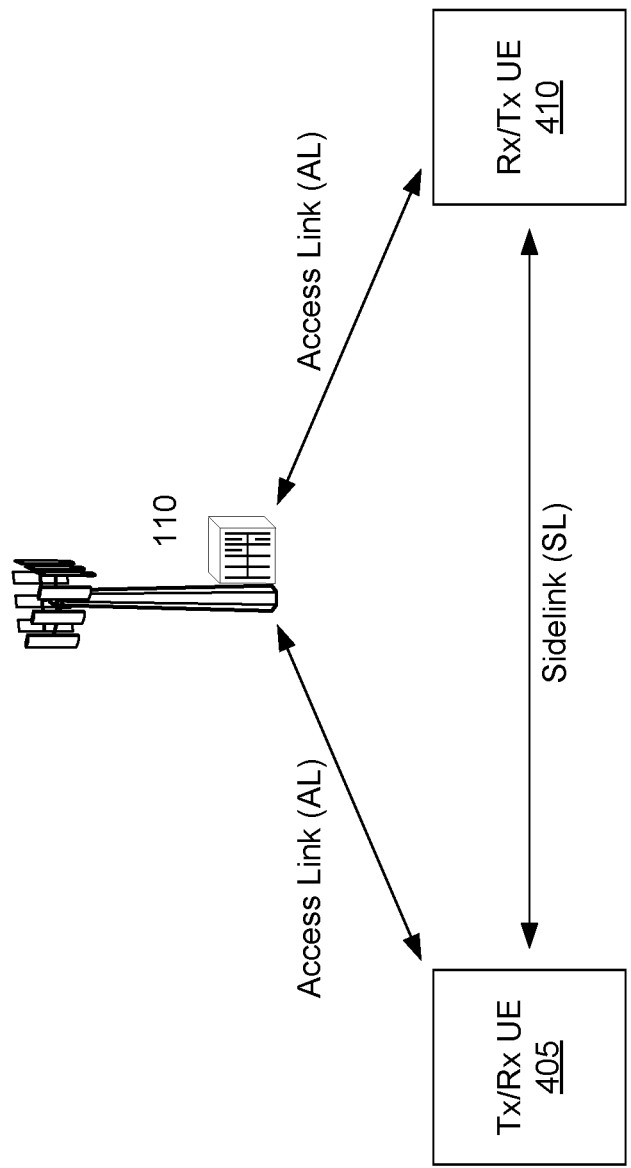
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
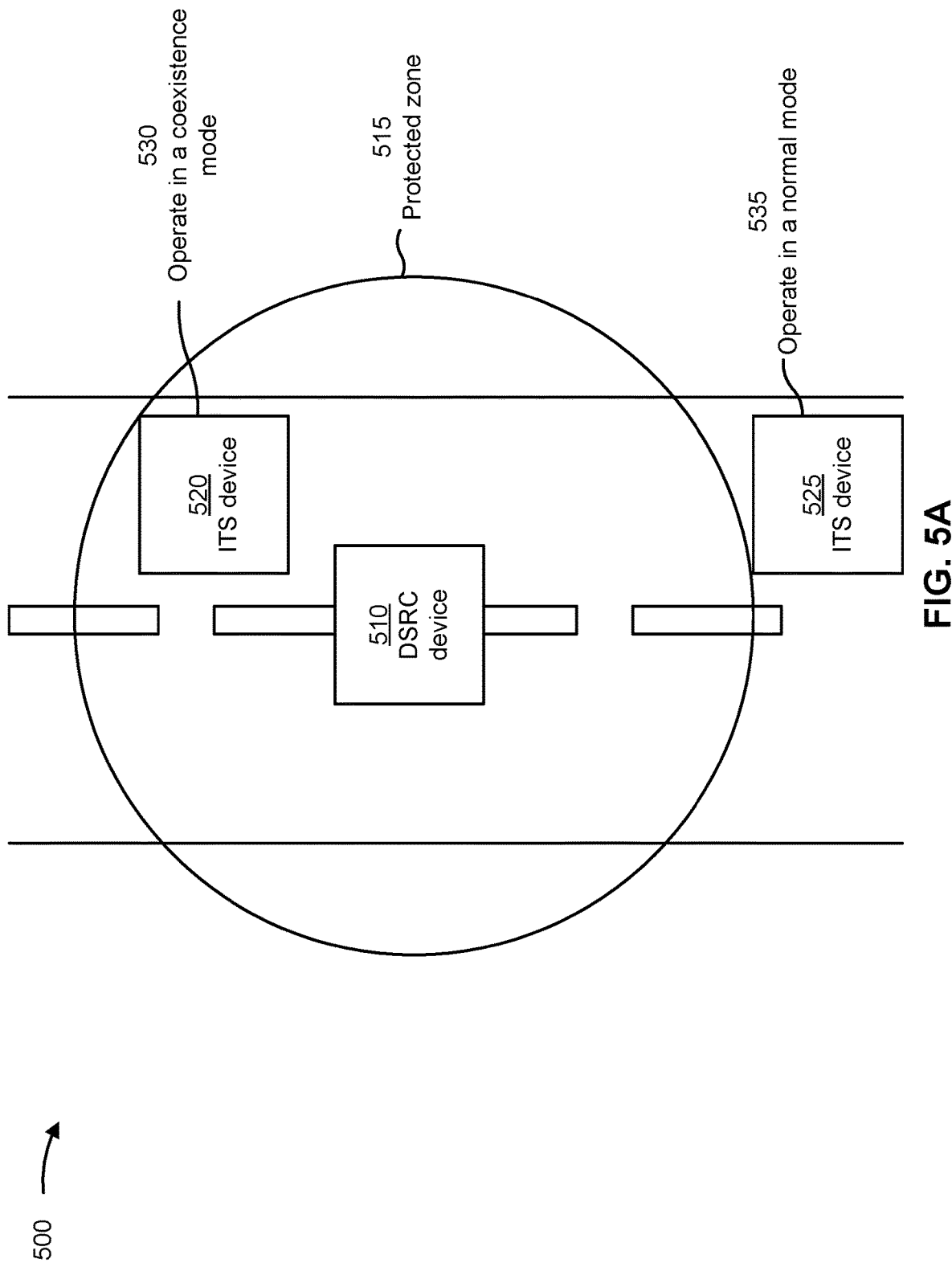

FIGS. 5A and 5B are diagrams illustrating an example 500 of interference mitigation in a sidelink environment, in accordance with the present disclosure. For example, FIGS. 5A and 5B depict interference mitigation for coexisting ITS equipment using an ITS frequency band and DSRC equipment using a DSRC frequency band, such as in an automotive environment or a road traffic environment, among other examples. "ITS equipment" or "ITS device" may refer to a wireless communication device, such as a UE or a roadside unit (RSU), that is operating in the ITS frequency band (e.g., as defined, or otherwise fixed, by a wireless communication standard). "DSRC equipment" or "DSRC device" may refer to a wireless communication device that is operating in the DSRC frequency band (e.g., as defined, or otherwise fixed, by a wireless communication standard). For example, a DSRC equipment or DSRC device may be a device that follows a DSRC standard as defined by the European Committee for Standardization (in French: Comite Europeen de Normalisation (CEN)). In some other cases, the DSRC equipment or DSRC device may be a device that follows a another communication protocol, such as a high data rate (HDR) DSRC device as defined, or otherwise fixed, by ETSI ES 200 674-1.

In some cases, ITS equipment may be fixed or immobile (such as an RSU mounted on the side of a road) or may be mobile (such as integrated in a UE or mounted in a vehicle (e.g., an onboard unit (OBU)). Similarly, DSRC equipment may be fixed or immobile (such as an RSU) or may be mobile (such as mounted in an OBU of a vehicle).

DSRC is a protocol used for wireless communication. For example, DSRC may use the wireless local area network (WLAN)-based IEEE 802.11p protocol as an enabling technology. DSRC may be used to enable devices mounted in vehicles to communicate with each other and other RSUs without involving or requiring cellular infrastructure. For example, DSRC may enable highly secure, high-speed direct communication between vehicles and the surrounding infrastructure, without involving any cellular infrastructure. In some cases, DSRC is utilized for electronic toll collection on a roadway. For example, RSUs or toll collection vehicles may include a DSRC device. The DSRC device may communicate with devices included in vehicles traveling on the roadway to toll or charge the vehicles for use of the roadway. Therefore, in some cases, DSRC signals are local in nature, such as within a tolling zone surrounding the DSRC device.

In some cases, the ITS frequency band may be in the 5.9 GHz band. For example, the ITS frequency band may include the spectrum from 5,855 MHz to 5,925 MHz. The DSRC frequency band may also include the 5.9 GHz band. For example, the DSRC frequency band may include the spectrum from 5,795 MHz to 5,815 MHz. Because of the small frequency separation between the ITS frequency band and the DSRC frequency band (and the fact that both systems operate in similar environments, such as a road traffic environment), there is a risk for potential interference.

For example, DSRC devices may be sensitive or susceptible to interference. In some cases, an ITS signal (e.g., transmitted by an ITS device) may cause blocking or interference at a DSRC receiver (e.g., a DSRC RSU or a DSRC OBU in a vehicle). In some cases, to avoid performance degradation, interfering signals at a DSRC device should be limited to a power density of −129 decibel-milliwatts (dBm) per MHz (dBm/MHz), which is a strict requirement. Therefore, interference mitigation may be required in order to avoid performance degradation in environments in which the ITS RAT and the DSRC RAT are coexisting.

For example, as shown in FIG. 5A, a DSRC device 510 may be located on a road (e.g., may be a fixed RSU or may be mounted in an OBU of a mobile vehicle). The DSRC device 510 may be associated with a protected zone 515. "Protected zone" refers to an area around a DSRC device where interference mitigation mechanisms are to be applied (e.g., by an ITS device), as explained in more detail below. "Mitigation mechanisms" may refer to a set of rules that an ITS device is to apply when located within a protected zone. For example, a wireless communication standard, such as the 3GPP or the ETSI, may define, or otherwise fix, the protected zones and/or the mitigation mechanisms (e.g., such as in ETSI Technical Specification 102 792). In some cases, a protected zone may be defined by a center point (e.g., at the DSRC device) and a radius (e.g., up to 255 meters). In some cases, a value of the radius for a protected zone may be a function of a transmit power used by an ITS device (e.g., the radius of a protected zone may be larger if an ITS device is using a larger transmit power). In some cases, the center point may be fixed, such as for RSU DSRC devices. In some other cases, the center point may change over time, such as for mobile DSRC devices. In some cases, an ITS device may store a protected zone database that defines or identifies a set of protected zones. For example, toll operators may publish a protected zone database that identifies the positions and protected zone radii of tolling stations (e.g., that use a DSRC device). In some cases, an ITS device may receive a message indicating a protected zone (e.g., indicating a center point and radius of a protected zone).

For example, an ITS device 520 may be located within (or inside of) the protected zone 515 associated with the DSRC device 510. The ITS device 520 may detect that the ITS device is located within the protected zone 515 based on a protected zone database stored by the ITS device 520 or based on receiving or detecting a message from the DSRC device 510. As described above, based on detecting that the ITS device 520 is located within the protected zone 515, the ITS device 520 may apply mitigation mechanisms to mitigate potential interference with the DSRC device 510. For example, as shown by reference number 530, the ITS device 520 may operate in a coexistence mode based on detecting that the ITS device 520 is located within the protected zone 515. "Coexistence mode" may refer to a mode of operation of the ITS device 520 that avoids harmful interference with a DSRC device. For example, a coexistence mode may be associated with one or more rules (e.g., transmit power limits, emissions limits, transmit time limits, and/or required off time limits) to be applied to mitigate the risk of potential interference to the DSRC device 510. Coexistence modes are described in more detail below in connection with FIG. 5B. Different coexistence modes may be defined, or otherwise fixed, by a wireless communication standard, such as the 3GPP and/or the ETSI.

When an ITS device is not located within a protected zone, the ITS device may operate in a normal mode.

"Normal mode" may refer to a mode of operation of an ITS device that is not associated with duty cycle limits (e.g., time limits associated with transmissions), may have no transmit power limits (or relaxed transmit power limits), and/or may have no emissions limits (or relaxed emissions limits). For example, the normal mode may be associated with a transmit power limit (and/or a power spectral density limit) that is greater than a transmit power limit associated with a coexistence mode. The normal mode for ITS devices may be defined, or otherwise fixed, by a wireless communication standard, such as the 3GPP, the ETSI, and/or the IEEE. "Emissions limit" and "emissions threshold" and/or similar terms may be used interchangeably herein. For example, an ITS device 525 may not be located within the protected zone 515 (or any other protected zones). Therefore, as shown by reference number 535, the ITS device 525 may operate in a normal mode (e.g., may not operate in a coexistence mode, as described in more detail below).

As shown in FIG. 5B, and by reference number 540, different coexistence modes may be defined for mitigating potential interference to DSRC devices, as explained above. For example, an ITS device that is located within a protected zone (e.g., protected zone 515) may operate in accordance with a coexistence mode (e.g., one of the coexistence modes shown in FIG. 5B). As described above, different coexistence modes may be defined, or otherwise fixed, by a wireless communication standard (e.g., ETSI Technical Specification 102 792).

As shown in FIG. 5B, the coexistence modes may be associated with an output power level limit (e.g., a transmit power level limit) in the ITS band (e.g., in the frequency range from 5,855 MHz to 5,925 MHz). The output power level limit may indicate an effective isotropic radiated power (EIRP) value (in dBm), which represents the radiated power in a particular direction (e.g., the direction of a beam), that an ITS device must remain at or below in the ITS band. For example, for a coexistence mode A and a coexistence mode B, the EIRP limit in the ITS band may be 10 dBm (e.g., an EIRP of an ITS device operating in coexistence mode A or B must not exceed 10 dBm in the ITS band). For a coexistence mode C and a coexistence mode D, the EIRP limit in the ITS band may be 33 dBm.

Additionally, the coexistence modes may be associated with an emissions level limit in the DSRC band (e.g., in the frequency range from 5,795 MHz to 5,815 MHz). The emissions level limit may be a limit on ITS unwanted emissions in the DSRC band (e.g., in the frequency range from 5,795 MHz to 5,815 MHz). The emissions level limit may indicate a power density limit (e.g., in dBm/MHz) of emissions seen in the DSRC band caused by transmissions of an ITS device (e.g., transmissions in the ITS band). For example, for the coexistence mode A, the emissions level limit may be −65 dBm/MHz EIRP. For the coexistence mode B, the emissions level limit may be −45 dBm/MHz EIRP. For the coexistence mode C and the coexistence mode D, the emissions level limit may be −30 dBm/MHz EIRP.

As shown in FIG. 5B, the coexistence modes may be associated with one or more duty cycle limits. For example, the coexistence modes may be associated with a transmission time limit (e.g., a $T_{ON}$ time) indicating a maximum amount of time for a transmission by an ITS device. Additionally, the coexistence modes may be associated with a required off time (e.g., a $T_{OFF}$ time) indicating a minimum amount of time between any two consecutive transmissions by an ITS device. Coexistence mode A may not be associated with a $T_{ON}$ time limit or a T OFF time limit (e.g., which may be the reason that the emissions level limit for the coexistence mode A is higher than other coexistence modes). For the coexistence mode B, the $T_{ON}$ time limit may be 1 millisecond (ms) (e.g., transmissions by an ITS device may be up to 1 millisecond in duration) and a $T_{OFF}$ time limit of 50 milliseconds (e.g., transmissions by an ITS device must be at least 50 milliseconds apart in time).

For the coexistence mode C, the $T_{ON}$ time limit may be 1 ms (e.g., transmissions by an ITS device may be up to 1 millisecond in duration). The $T_{OFF}$ time limit for the coexistence mode C may be determined according to Equation 1, shown below:

$$T_{OFF(C)} = (45 \times N) \qquad \text{Equation 1:}$$

N may be NITS/2, where Nus is the number of other ITS devices using the channel (e.g., operating in the ITS band) that are within the protected zone (e.g., that have a position closer to the center point of the protected zone than the radius associated with the protected zone). When equation 1 results in a value of less than 50 milliseconds, $T_{OFF(C)}$ may be set to 50 milliseconds. For the coexistence mode D, the $T_{ON}$ time limit may be from 1 millisecond to 7 milliseconds (e.g., transmissions by an ITS device may be up to 7 milliseconds in duration). The $T_{OFF}$ time limit for the coexistence mode D may be determined according to Equation 2, shown below:

$$T_{OFF(D)} \geq T_{OFF(C)} + 15.4 \times N \times (T_{ON} - 1) \qquad \text{Equation 2:}$$

Therefore, for coexistence modes C and D, an ITS device may be required to monitor and keep track of the positions of other ITS devices. In a V2X environment, this may be increasingly difficult as the V2X environment is a distributed environment and the position of each V2X device within the V2X environment may be difficult, or impossible, for a V2X to determine and/or monitor. Therefore, V2X devices operating in the ITS band (e.g., V2X devices operating as ITS devices) may be limited to operating in the coexistence mode A or the coexistence mode B when in a protected zone.

In some cases, a sidelink system, such as a V2X system, may be a frequency-division multiple access (FDMA) system and/or an orthogonal frequency-division multiple access (OFDMA) system in which multiple devices are enabled to transmit simultaneously (e.g., using frequency division multiplexing). For example, in an FDMA system or an OFDMA system, multiple devices may use a partial frequency domain allocation (e.g., of an available bandwidth for a channel) to enable the multiple devices to transmit at substantially the same time using different frequency domain resources. For example, for a V2X system (e.g., an ITS system), a channel bandwidth may be 10 MHz. The channel bandwidth may be divided into sub-channels (e.g., partial frequency domain allocations of the channel bandwidth), such as five 2 MHz sub-channels. Therefore, in some cases, there may be multiple transmissions that use a same time resource and different sub-channels in the V2X environment. For example, in a V2X system, a frequency allocation for a transmission may be determined based on a packet length of a payload of the transmission, whether retransmissions are to be used, and/or a modulation and coding scheme (MCS) to be used, among other examples. In some cases, a device may select a smallest required frequency allocation for the transmission to allow for other devices to transmit at the same time using other frequency allocations (e.g., using frequency division multiplexing, as described above).

However, the interference mitigation mechanisms (e.g., the coexistence modes) for DSRC devices described above may be designed assuming that devices always transmit using a full channel bandwidth, and therefore that there are not multiple transmissions at the same time. As a result, even if each transmission complies with the interference mitigation mechanisms (e.g., the coexistence modes), the multiple transmissions at the same time in the V2X environment may cause an aggregated or cumulative interference that causes problems or blockages for a DSRC device. Therefore, in some cases, if a device (e.g., an ITS device) is located within a protected zone and the device is using a bandwidth (e.g., a frequency domain resource allocation) that is smaller than, or less than, a maximum occupied channel bandwidth (e.g., a maximum available frequency domain resource allocation), then the device may be required to use a more limiting interference mitigation mechanism for protecting DSRC devices. For example, an ITS device that is using less than a maximum occupied channel bandwidth may be required to use coexistence mode A described above (e.g., coexistence modes B, C, and D may not be available for an ITS device that is using less than a maximum occupied channel bandwidth).

"Maximum occupied channel bandwidth," "maximum available frequency domain resource allocation," "full available frequency domain resource allocation," and/or similar terms may refer to an available bandwidth (e.g., a maximum occupied bandwidth) for the channel. For example, an available bandwidth (e.g., a maximum occupied bandwidth) for the channel may be a maximum bandwidth that a device communicating on the channel is enabled to occupy. In some cases, the available bandwidth may be defined, or otherwise fixed, by a wireless communication standard. For example, a frequency band may be associated with an available bandwidth (e.g., a maximum occupied bandwidth) that devices communicating using the frequency band are enabled to use. For example, for an ITS frequency band, a channel bandwidth (e.g., a maximum occupied bandwidth) may be 10 MHz (e.g., as defined, or otherwise fixed, by a wireless communication standard).

As described above, coexistence mode A may be associated with a lower emissions level limit in the DSRC band. For example, coexistence mode B may allow for a 20 dBm/MHz higher emissions level in the DSRC band compared to an allowable emissions level associated with coexistence mode A. Because of the lower emissions level limit in the DSRC band for coexistence mode A, an ITS device may be unable to realize an output power level that is allowed for coexistence mode A. In other words, an ITS device may not be capable of transmitting with an output power level of 10 dBm EIRP (e.g., which is allowed in coexistence mode A) because a transmission with an output power level of 10 dBm EIRP may result in an emissions level in the DSRC band that does not satisfy the emissions level limit of coexistence mode A. Therefore, the ITS device operating in coexistence mode A may be required to transmit with a lower output power level to satisfy the emissions level limit. However, due to the 20 dBm/MHz relaxation in the emissions level limit from coexistence mode A to coexistence mode B, an ITS device operating in coexistence mode B may be enabled to transmit with an output power level of 10 dBm EIRP while also satisfying the emissions level limit of coexistence mode B.

Therefore, limiting a device (e.g., an ITS device and/or a V2X device) to coexistence mode A may result in degraded communication performance as the device may be required to use a lower transmit power (e.g., compared to a transmit power that the device is enabled to use in other coexistence modes). For example, as described above, V2X devices operating in the ITS band may be limited to coexistence modes A and B due to the difficulty in determining the transmit off time limits of coexistence modes C and D. Additionally, as the V2X system may be an FDMA and/or OFDMA system, when the V2X device transmits with less than a maximum available channel bandwidth in a protected zone, the V2X device may be limited to using only coexistence mode A. However, a frequency domain resource allocation for signals may be determined by a device prior to (or without consideration of) a determination of a coexistence mode in which the device is to operate. For example, frequency domain resource allocation may be performed by a medium access control (MAC) layer of the device, whereas location information (e.g., associated with protected zones) may be in an application layer of the device. As a result, the V2X device may be required to use a lower transmit power to satisfy the higher emissions level limit in the DSRC band specified by coexistence mode A. Using a lower transmit power degrades communication performance and reliability of communications of the V2X device.

Some techniques and apparatuses described herein enable location based frequency domain resource allocation. For example, a device, such as a UE, operating in a protected zone may always schedule a full available frequency domain resource allocation (e.g., a maximum occupied bandwidth) for a channel based at least in part on a location of the UE being associated with a protected zone for interference mitigation. In other words, when a device detects that the device is within (or near) a protected zone, the device may refrain from using frequency division multiplexing and may use a full available frequency domain resource allocation (e.g., regardless of a length or size of a packet to be transmitted). When the device detects that the device is no longer within (or is a threshold distance away from) a protected zone, the device may resume using frequency division multiplexing and may use a frequency domain resource allocation that is selected based on a length or size of a packet to be transmitted, among other examples. Additionally, or alternatively, when a device detects that the device is within (or is approaching) a protected zone, the device may refrain from using retransmissions of a communication. For example, using retransmissions may cause the device to not satisfy a required off time (e.g., a $T_{OFF}$ time) of a less restrictive coexistence mode (e.g., coexistence mode B). Therefore, the device may refrain from using retransmissions to ensure that the required off time (e.g., a $T_{OFF}$ time) of a less restrictive coexistence modes is satisfied while the device is within (or near) a protected zone.

As a result, the device (e.g., the UE operating using an ITS operating frequency) may be enabled to use a higher transmit power when the device is within (or is approaching) a protected zone. For example, using the full available frequency domain resource allocation (e.g., the maximum occupied bandwidth) may enable the device to operate in a less restrictive coexistence mode. For example, using the full available frequency domain resource allocation (e.g., the maximum occupied bandwidth) may enable the device to operate in the coexistence mode B rather than the coexistence mode A. As a result, the device (e.g., the UE operating using an ITS operating frequency) that is capable of using an OFDMA and/or FDMA system may be enabled to use a higher transmit power when a protected zone is detected. Using a higher transmit power may improve communication performance and improve reliability of communications of the device.

Figure 6:
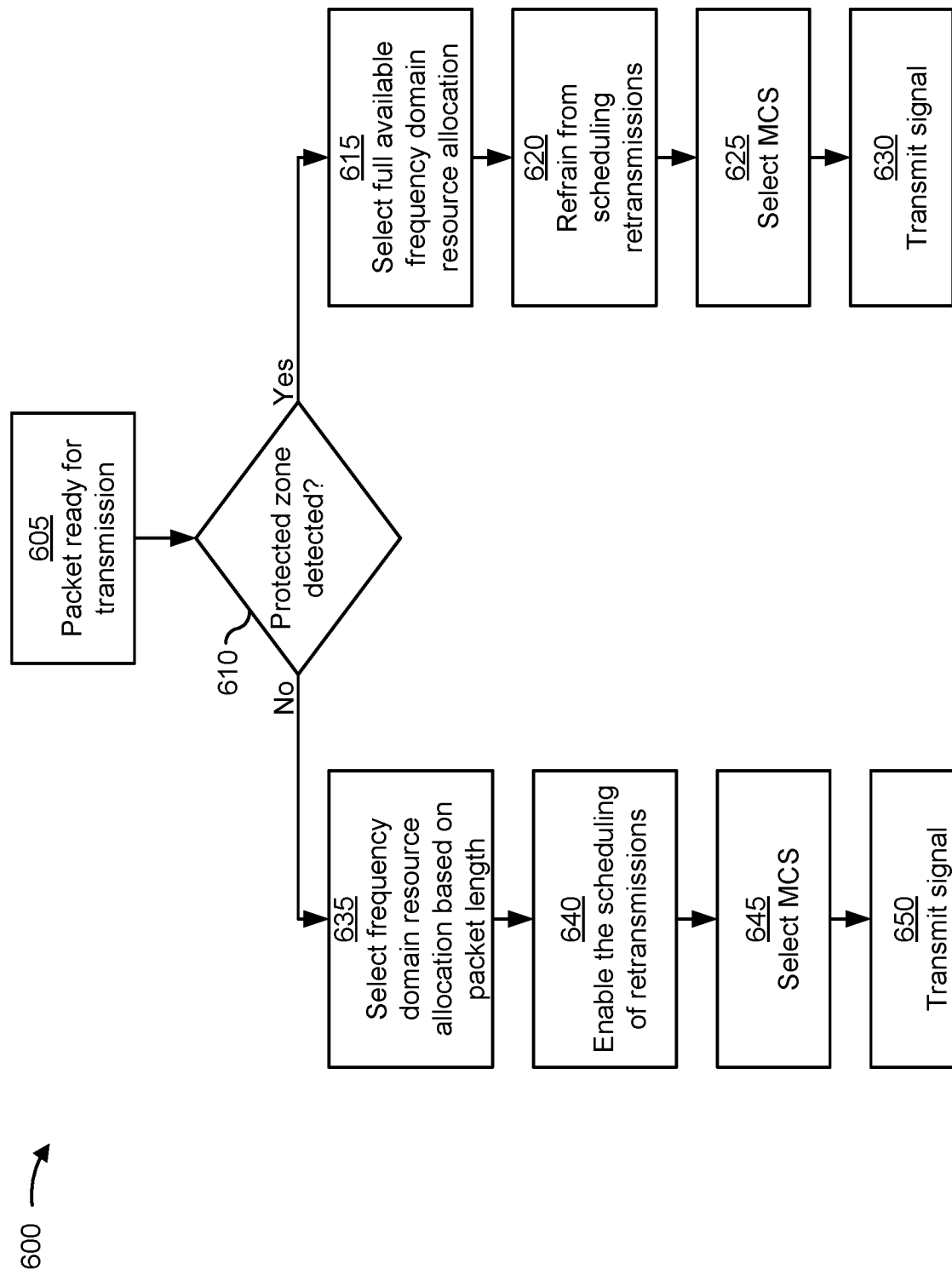
FIG. 6 is a diagram illustrating an example associated with location based frequency domain resource allocation, in accordance with the present disclosure.

FIG. 6 is a diagram illustrating an example 600 associated with a location based frequency domain resource allocation, in accordance with the present disclosure. As shown in FIG. 6, example 600 may include a process performed by a wireless communication device, such as a UE 120, an OBU, and/or another device capable of transmitting in a V2X frequency band (or ITS frequency band) as described herein. In some aspects, the wireless communication device may be included in a wireless network, such as wireless network 100, a sidelink environment, a V2X environment, and/or an ITS environment, among other examples. For example, the wireless communication device may be a device that is operating using a V2X system and/or is operating using an ITS frequency band.

The wireless communication device may detect (e.g., using controller/processor 280 and/or memory 282) that a packet is ready for transmission (block 605). For example, the wireless communication device may detect a packet that is to be transmitted by the wireless communication device. In some aspects, the packet may be associated with a V2X communication. In some aspects, the packet may be associated with an ITS communication (e.g., a communication that is to be transmitted using an ITS frequency band).

Based at least in part on detecting that the packet is ready for transmission, the wireless communication device may generate a signal for transmitting the packet. As described in more detail below, a manner in which the wireless communication device generates the signal may be based at least in part on a location of the wireless communication device. For example, the manner in which the wireless communication device determines a frequency domain resource allocation for the signal may be based at least in part on a location of the wireless communication device.

For example, the wireless communication device may determine (e.g., using controller/processor 280 and/or memory 282) whether a protected zone has been detected (block 610). For example, the wireless communication device may determine whether a location of the wireless communication device is associated with (e.g., is located within or within a threshold distance of) a protected zone for interference mitigation. For example, the wireless communication device may determine whether a location of the wireless communication device is associated with a protected zone based at least in part on a database stored by the wireless communication device (e.g., a database indicating locations of protected zones) and/or based at least in part on receiving a message indicating a location of one or more protected zones, among other examples. In some aspects, an indication that a location of the wireless communication device is associated with (e.g., is located within or within a threshold distance of) a protected zone for interference mitigation may be passed from one protocol layer of the wireless communication device to another protocol layer to enable location based frequency domain resource allocation. For example, a message or instruction may be passed from the application layer of the wireless communication device to the MAC layer of the wireless communication device indicating that a protected zone has been detected (e.g., to enable the MAC layer to select the frequency domain resource allocation for the signal based at least in part on the detection of the protected zone, as described in more detail below).

As described above, "protected zone" may refer to an area around a DSRC device in which interference mitigation mechanisms are to be applied. The protected zone and/or the interference mitigation mechanisms may be defined, or otherwise fixed, by a wireless communication standard, such as the 3GPP and/or the ETSI. For example, the interference mitigation mechanisms may include one or more coexistence modes, such as the coexistence mode A, the coexistence mode B, the coexistence mode C, and/or the coexistence mode D described above.

In some aspects, the wireless communication device may determine whether a protected zone has been detected based at least in part on a database stored by the wireless communication device. For example, the wireless communication device may store or access a protected zone database that defines or identifies a set of protected zones. For example, toll operators may publish a protected zone database that identifies the positions and protected zone radii of tolling stations (e.g., that use a DSRC device). The wireless communication device may use the database to determine when the location of the wireless communication device is within or near a protected zone (e.g., identified by the database). For example, the wireless communication device may determine a location of the wireless communication device (e.g., may determine coordinates of a location of the wireless communication device). The wireless communication device may determine whether the location is associated with a protected zone based at least in part on searching or parsing the database stored by the wireless communication device (e.g., to determine whether the location of the wireless communication device is within, or near, a stored location (e.g., a stored position and radius) of a protected zone. Additionally, or alternatively, the wireless communication device may determine whether a protected zone has been detected based at least in part on a message received by the wireless communication device (e.g., from a DSRC device). For example, a DSRC device may transmit and/or broadcast an indication of a protected zone associated with the DSRC device. The wireless communication device may receive the indication and may determine when the location of the wireless communication device is within or near the protected zone (e.g., indicated by the message).

If the wireless communication device determines that a protected zone has been detected (block 610—Yes), then the wireless communication device may generate (e.g., using controller/processor 280, transmit processor 264, TX MIMO processor 266, MOD 254, and/or memory 282) a signal for the packet using a full available frequency domain resource allocation for a channel (block 615). For example, the wireless communication device may select a full available frequency domain resource allocation for the channel (e.g., the V2X channel and/or the ITS channel). The full available frequency domain resource allocation may be an available bandwidth (e.g., a maximum occupied bandwidth) for the channel. For example, for an ITS frequency band, a channel bandwidth may be 10 MHz. The wireless communication device (e.g., operating using the ITS frequency band) may select the frequency domain resource allocation for the signal to be the entire 10 MHz channel bandwidth.

The wireless communication device may generate the signal for the packet using the full available frequency domain resource allocation for the channel regardless of a length or size of the packet based at least in part on the location of the wireless communication device being associated with the protected zone. For example, typically the wireless communication device (e.g., a V2X device) may select a frequency domain resource allocation for a signal based at least in part on the length or size of the packet (e.g., to enable the wireless communication device to select a smallest acceptable frequency domain resource allocation for the signal). However, based at least in part on detecting the protected zone (e.g., as described above), the wireless communication device may select the full available frequency domain resource allocation for the channel regardless of the length or the size of the packet.

In some aspects, the wireless communication device may refrain from generating a signal using frequency division multiplexing operations based at least in part on the location of the wireless communication device being associated with the protected zone (e.g., being within the protected zone or within a threshold distance of the protected zone). For example, while the location of the wireless communication device is associated with the protected zone, the wireless communication device may operate in a time division multiplex (TDM) manner only (e.g., and not a frequency division multiplex (FDM) manner). In some aspects, a message or instruction may be passed from the application layer of the wireless communication device to the MAC layer of the wireless communication device indicating that a protected zone has been detected (e.g., to enable the MAC layer to select the frequency domain resource allocation for the signal based at least in part on the detection of the protected zone).

Generating the signal for the packet using the full available frequency domain resource allocation for the channel may enable the wireless communication device to operate in accordance with a first coexistence mode (e.g., the coexistence mode B) associated with the protected zone that has a lower emissions threshold than a second coexistence mode (e.g., the coexistence mode A) associated with the protected zone. For example, as described above, in some cases, devices using less than a full available frequency domain resource allocation for the channel may be limited to or restricted to the second coexistence mode (e.g., the coexistence mode A) associated with the protected zone. Therefore, as described in more detail below, by enabling the wireless communication device to operate in accordance with a first coexistence mode (e.g., the coexistence mode B), the wireless communication device may select a higher transmit power for the signal as compared to a transmit power that would have been used operating in accordance with the second coexistence mode (e.g., the coexistence mode A).

Additionally, or alternatively, if the wireless communication device determines that a protected zone has been detected (block 610—Yes), then the wireless communication device may refrain from scheduling retransmissions (e.g., using controller/processor 280 and/or memory 282) of the signal (block 620). For example, the wireless communication device may refrain from scheduling retransmissions of the signal based at least in part on the location of the wireless communication device being associated with the protected zone. In some aspects, the wireless communication device may disable or restrict retransmissions of signals based at least in part on the location of the wireless communication device being associated with the protected zone. The wireless communication device may refrain from scheduling retransmissions of the signal to enable the wireless communication device to operate in accordance with the first coexistence mode (e.g., the coexistence mode B) associated with the protected zone that has a lower emissions threshold than the second coexistence mode (e.g., the coexistence mode A) associated with the protected zone.

For example, as described above, the first coexistence mode (e.g., the coexistence mode B) may be associated with a required off time (e.g., a $T_{OFF}$ time) indicating a minimum amount of time between any two consecutive transmissions (e.g., 50 milliseconds). In some cases, a retransmission that would otherwise be scheduled by the wireless communication device may occur less than the required off time (e.g., less than 50 milliseconds) from the original transmission. Therefore, if the wireless communication device is enabled to schedule retransmissions while the location of the wireless communication device is being associated with the protected zone, then the wireless communication device may operate in accordance with the second coexistence mode (e.g., the coexistence mode A), as the retransmissions may cause the required off time of the first coexistence mode (e.g., the coexistence mode B) to not be satisfied. Therefore, by refraining from scheduling retransmissions while the wireless communication device is located within (or near) a protected zone, the wireless communication device may be enabled to operate in accordance with the first coexistence mode (e.g., the coexistence mode B) rather than the second coexistence mode (e.g., the coexistence mode A).

The wireless communication device may select (e.g., using controller/processor 280 and/or memory 282) an MCS for the signal (block 625). For example, the wireless communication device may select an MCS for the signal based at least in part on the length or the size of the packet and/or the frequency domain resource allocation for the signal (e.g., the full available frequency domain resource allocation), among other examples. For example, the frequency domain resource allocation for the signal may be selected without regard for the length or the size of the packet, so the frequency domain resource allocation for the signal may be larger than a minimum or an acceptable frequency domain resource allocation that is based at least in part on the length or the size of the packet. For example, the frequency domain resource allocation for the signal may include more resource blocks (RBs) than a minimum or an acceptable frequency domain resource allocation that is based at least in part on the length or the size of the packet. Therefore, the wireless communication device may select a more robust MCS for the signal. Using a more robust MCS may improve reliability of the signal. For example, using a robust MCS may improve reliability because the additional RBs in the frequency domain resource allocation may be used (e.g., based at least in part on the robust MCS) to generate additional encoded packets (e.g., redundant packets) of the signal (e.g., thereby improving the reliability of the signal).

The wireless communication device may generate the signal using the full available frequency domain resource allocation for the channel. Additionally, or alternatively, the wireless communication device may refrain from scheduling retransmissions of the signal. In some aspects, the wireless communication device may generate the signal using the full available frequency domain resource allocation and using the selected MCS (e.g., as described above). As a result, the wireless communication device may be enabled to operate in accordance with the first coexistence mode (e.g., the coexistence mode B) associated with the protected zone that has a lower emissions threshold (e.g., an emissions threshold of −45 dBm/MHz as compared to an emissions threshold of −65 dBm/MHz for the coexistence mode A). For example, the wireless communication device may detect that the signal is generated using the full available frequency domain resource allocation for the channel and that a time between the scheduled transmission of the signal and a next transmission satisfies the required off time of the first coexistence mode (e.g., based at least in part on refraining from scheduling retransmissions). Therefore, the wireless communication device may be enabled to operate in accordance with the first coexistence mode (e.g., the coexistence mode B).

For example, the wireless communication device may determine a transmit power for the signal based at least in part on the first coexistence mode (e.g., the coexistence mode B). As described above, operating in accordance with the first coexistence mode (e.g., the coexistence mode B) may enable the wireless communication device to determine a higher transmit power for the signal than if the wireless communication device were to operate in accordance with the second coexistence mode (e.g., the coexistence mode A). For example, because of the relaxed emissions level threshold for emissions in the DSRC band associated with the first coexistence mode (e.g., the coexistence mode B), the wireless communication device may be enabled to determine a transmit power for the signal up to the output power level limit (e.g., 10 dBm EIRP) associated with the first coexistence mode (e.g., the coexistence mode B). In contrast, if the wireless communication device were to operate in accordance with the second coexistence mode (e.g., the coexistence mode A), then the wireless communication device may be limited to a transmit power for the signal that is less than the output power level limit (e.g., 10 dBm EIRP) associated with the second coexistence mode (e.g., the coexistence mode A), because of the more strict emissions level threshold for emissions in the DSRC band associated with the second coexistence mode.

The wireless communication device may transmit (e.g., using controller/processor 280, transmit processor 264, TX MIMO processor 266, MOD 254, antenna 252, and/or memory 282) the signal for the packet using the full available frequency domain resource allocation for the channel (block 630). For example, the wireless communication device may generate the signal and determine the transmit power for the signal as described above based at least in part on detecting the protected zone. In some aspects, the wireless communication device may transmit the signal for the packet using the full available frequency domain resource allocation for the channel and in accordance with the first coexistence mode (e.g., the coexistence mode B). For example, the wireless communication device may transmit the signal for the packet using a transmit power that is in accordance with the first coexistence mode (e.g., the coexistence mode B) associated with the protected zone. In some aspects, the wireless communication device may transmit a V2X signal for the packet. In some aspects, the wireless communication device may transmit an ITS signal for the packet. For example, the wireless communication device may transmit the signal using the full available frequency domain resource allocation for a channel associated with the ITS frequency band.

If the wireless communication device determines that a protected zone has not been detected (block 610—No), then the wireless communication device may generate (e.g., using controller/processor 280, transmit processor 264, TX MIMO processor 266, MOD 254, and/or memory 282) a signal for the packet using a frequency domain resource allocation that is based at least in part on the size or the length of the packet (block 635). For example, if the wireless communication device determines that the location of the wireless communication device is not associated with (e.g., is not within or near) a protected zone, then the wireless communication device may generate a signal for the packet using a frequency domain resource allocation that is based at least in part on the size or the length of the packet.

For example, the wireless communication device may select the frequency domain resource allocation for the signal to be a smallest acceptable frequency domain resource allocation based at least in part on the size or the length of the packet. For example, the wireless communication device may select the frequency domain resource allocation for the signal to be a number of RBs that enable the wireless communication device to transmit the signal with an acceptable reliability level. Selecting the frequency domain resource allocation for the signal based at least in part on the size or the length of the packet may enable the wireless communication device to operate in an FDM manner (e.g., in an FDMA and/or OFDMA manner). For example, the wireless communication device may select a frequency domain resource allocation for the signal that is less than the full available frequency domain resource allocation (e.g., is less than the maximum occupied bandwidth) for the channel. Therefore, the wireless communication device (and/or other devices) may be enabled to use different frequency domain resources of the channel at the same time as the signal (e.g., in an FDM manner).

In other words, based at least in part on determining that the location of the wireless communication device is not associated with (e.g., is not within or near) a protected zone, the wireless communication device may be enabled to operate in an FDM manner. For example, one or more frequency division multiplexed signals may be transmitted (e.g., including the signal generated by the wireless communication device) based at least in part on location of the wireless communication device not being associated with (e.g., not within or near) a protected zone.

If the wireless communication device determines that a protected zone has not been detected (block 610—No), then the wireless communication device may schedule (e.g., using controller/processor 280, transmit processor 264, TX MIMO processor 266, MOD 254, antenna 252, and/or memory 282) one or more retransmissions of the signal to improve reliability of the signal (block 640). For example, if the wireless communication device determines that the location of the wireless communication device is not associated with (e.g., is not within or near) a protected zone, then the wireless communication device may be enabled to schedule and/or transmit one or more retransmissions of the signal (e.g., as the required off time of the coexistence mode B does not need to be satisfied).

The wireless communication device may select (e.g., using controller/processor 280 and/or memory 282) an MCS for the signal (block 645). For example, the wireless communication device may select an MCS for the signal based at least in part on the length or the size of the packet and/or the frequency domain resource allocation for the signal (e.g., that may be less than the full available frequency domain resource allocation), among other examples. The wireless communication device may transmit (e.g., using controller/processor 280, transmit processor 264, TX MIMO processor 266, MOD 254, antenna 252, and/or memory 282) the signal for the packet using the frequency domain resource allocation that is based at least in part on the length or the size of the packet (block 650). For example, the wireless communication device may transmit the signal for the packet using the MCS selected for the signal, as described above. The wireless communication device may transmit the signal using a transmit power that is not limited by a coexistence mode. In other words, the wireless communication device may operate in a normal mode based at least in part on determining that the location of the wireless communication device is not associated with (e.g., is not within or near) a protected zone.

As a result, the wireless communication device may be enabled to select and/or determine a frequency domain resource allocation for a signal based at least in part on a location of the wireless communication device. For example, the wireless communication device may select a full available frequency domain resource allocation for a channel if the location of the wireless communication device is associated with a protected zone. This may enable the wireless communication device to improve performance of communications within or near the protected zone as the wireless communication device may use a higher transmit power based at least in part on using the full available frequency domain resource allocation for the signal. For example, using the full available frequency domain resource allocation may enable the wireless communication device to operate in the coexistence mode B, rather than the coexistence mode A, while the location of the wireless communication device is associated with the protected zone.

The wireless communication device may select a frequency domain resource allocation for a signal based at least in part on a size or length of a packet to be transmitted when the location of the wireless communication device is not associated with a protected zone. For example, the wireless communication device may generate a different signal for a different packet (than the packet transmitted in the protected zone), using a frequency domain resource allocation that is based at least in part on a length or size of the different packet, based at least in part on a location (e.g., a different location that the location associated with the protected zone) of the wireless communication device not being associated with the protected zone for interference mitigation. The wireless communication device may transmit the different signal for the different packet using the frequency domain resource allocation that is based at least in part on the length or the size of the different packet. This enables the wireless communication device to operate in an FDM manner (e.g., an FDMA manner) when the location of the wireless communication device is not associated with a protected zone, thereby improving the efficiency of communications in the wireless network.

As indicated above, FIG. 6 is provided as an example. Other examples may differ from what is described with respect to FIG. 6.

FIG. 7 is a diagram illustrating an example process 700 performed, for example, by a wireless communication device, in accordance with the present disclosure. Example process 700 is an example where the wireless communication device (e.g., the wireless communication device described above in connection with FIG. 6) performs operations associated with location based frequency domain resource allocation. As shown in FIG. 7, dashed lines, or dashed block, may indicate optional steps.

As shown in FIG. 7, in some aspects, process 700 may include determining a location of the wireless communication device (block 710). For example, the wireless communication device (e.g., using determination component 810, depicted in FIG. 8) may determine a location of the wireless communication device, as described above.

As further shown in FIG. 7, in some aspects, process 700 may include determining whether the location of the wireless communication device is associated with a protected zone for interference mitigation (block 720). For example, the wireless communication device (e.g., using determination component 810, depicted in FIG. 8) may determine whether the location of the wireless communication device is associated with a protected zone for interference mitigation, as described above. In some aspects, the wireless communication device may determine whether the location of the wireless communication device is associated with a protected zone for interference mitigation based at least in part on at least one of a database stored by the wireless communication device or a message received by the wireless communication device.

As further shown in FIG. 7, in some aspects, process 700 may include determining a frequency domain resource allocation for a signal based at least in part on determining whether the location of the wireless communication device is associated with a protected zone for interference mitigation (block 730). For example, the wireless communication device (e.g., using determination component 810, depicted in FIG. 8) may determine a frequency domain resource allocation for a signal based at least in part on determining whether the location of the wireless communication device is associated with a protected zone for interference mitigation, as described above. For example, the wireless communication device may determine that the frequency domain resource allocation for the signal is a full available frequency domain resource allocation for a channel based at least in part on determining that the location of the wireless communication device is associated with a protected zone for interference mitigation. Alternatively, the wireless communication device may determine the frequency domain resource allocation for the signal using a size or length of a packet associated with the signal based at least in part on determining that the location of the wireless communication device is not associated with a protected zone for interference mitigation.

As shown in FIG. 7, in some aspects, process 700 may include generating the signal for the packet using the full available frequency domain resource allocation for the channel based at least in part on the location of the wireless communication device being associated with a protected zone for interference mitigation (block 740). For example, the wireless communication device (e.g., using signal generation component 808, depicted in FIG. 8) may generate the signal for the packet using the full available frequency domain resource allocation for the channel based at least in part on the location of the wireless communication device being associated with the protected zone for interference mitigation, as described above.

As further shown in FIG. 7, in some aspects, process 700 may include determining a coexistence mode for the wireless communication device associated with the protected zone for interference mitigation (block 750). For example, the wireless communication device (e.g., using determination component 810, depicted in FIG. 8) may determine a coexistence mode for the wireless communication device associated with the protected zone for interference mitigation, as described above. For example, using the full available frequency domain resource allocation for the channel enables the wireless communication device to determine to operate in accordance with a first coexistence mode associated with the protected zone that has a lower emissions threshold than a second coexistence mode associated with the protected zone. Alternatively, the wireless communication device may determine to operate in a normal mode based at least in part on determining that the location of the wireless communication device is not associated with a protected zone for interference mitigation.

As further shown in FIG. 7, in some aspects, process 700 may include selecting a modulation and coding scheme (MCS) for the signal (block 760). For example, the wireless communication device (e.g., using determination component 810, depicted in FIG. 8) may select an MCS for the signal, as described above. For example, the wireless communication device may select the MCS for the signal based at least in part on determining the frequency domain resource allocation for a signal. For example, the wireless communication device may select the MCS for the signal based at least in part on generating the signal using the full available frequency domain resource allocation for the channel. In some aspects, the wireless communication device may select the MCS for the signal based at least in part on generating a different signal using a frequency domain resource allocation that is based at least in part on a length or size of the different packet, based at least in part on a different location of the wireless communication device not being associated with the protected zone for interference mitigation.

As further shown in FIG. 7, in some aspects, process 700 may include determining a transmit power for the signal based at least in part on the coexistence mode (block 770). For example, the wireless communication device (e.g., using determination component 810, depicted in FIG. 8) may determine a transmit power for the signal based at least in part on the coexistence mode, as described above. For example, using the full available frequency domain resource allocation for the channel enables the wireless communication device to determine to operate in accordance with a first coexistence mode associated with the protected zone that has a lower emissions threshold than a second coexistence mode associated with the protected zone. The wireless communication device may determine the transmit power for the signal based at least in part on the first coexistence mode. Alternatively, the wireless communication device may determine a transmit power for different signal in accordance with a normal mode based at least in part on a different location of the wireless communication device not being associated with the protected zone for interference mitigation.

As further shown in FIG. 7, in some aspects, process 700 may include transmitting the signal for the packet using the full available frequency domain resource allocation for the channel (block 780). For example, the wireless communication device (e.g., using transmission component 804, depicted in FIG. 8) may transmit the signal for the packet using the full available frequency domain resource allocation for the channel, as described above. For example, the wireless communication device may transmit the signal for the packet using the selected MCS and the determined transmit power for the signal. In some aspects, the wireless communication device may transmit the signal for the packet in accordance with the determined coexistence mode associated with the protected zone. In some aspects, the wireless communication device may transmit a different signal for a different packet, using a frequency domain resource allocation that is based at least in part on the length or the size of the different packet, based at least in part on a different location of the wireless communication device not being associated with the protected zone for interference mitigation.

As further shown in FIG. 7, in some aspects, process 700 may include refraining from scheduling retransmissions of the signal based at least in part on the location of the wireless communication device being associated with the protected zone (block 790). For example, the wireless communication device (e.g., using determination component 810, depicted in FIG. 8) may refrain from scheduling retransmissions of the signal based at least in part on the location of the wireless communication device being associated with the protected zone, as described above. In some aspects, the wireless communication device may transmit (and/or schedule) one or more retransmissions of a different signal for a different packet based at least in part on a different location of the wireless communication device not being associated with the protected zone for interference mitigation.

Process 700 may include additional aspects, such as any single aspect or any combination of aspects described below and/or in connection with one or more other processes described elsewhere herein.

In a first aspect, process 700 includes refraining from scheduling retransmissions of the signal based at least in part on the location of the wireless communication device being associated with the protected zone.

In a second aspect, alone or in combination with the first aspect, transmitting the signal for the packet includes refraining from transmitting using frequency division multiplexing operations based at least in part on the location of the wireless communication device being associated with the protected zone.

In a third aspect, alone or in combination with one or more of the first and second aspects, transmitting the signal for the packet includes transmitting the signal for the packet using a transmit power in accordance with a coexistence mode associated with the protected zone.

In a fourth aspect, alone or in combination with one or more of the first through third aspects, transmitting the signal for the packet using the full available frequency domain resource allocation for the channel enables the wireless communication device to operate in accordance with a first coexistence mode associated with the protected zone that has a lower emissions threshold than a second coexistence mode associated with the protected zone.

In a fifth aspect, alone or in combination with one or more of the first through fourth aspects, generating the signal for the packet includes generating the signal for the packet using the full available frequency domain resource allocation for the channel regardless of a length or size of the packet based at least in part on the location of the wireless communication device being associated with the protected zone.

In a sixth aspect, alone or in combination with one or more of the first through fifth aspects, process 700 includes generating a different signal for a different packet, using a frequency domain resource allocation that is based at least in part on a length or size of the different packet, based at least in part on a different location of the wireless communication device not being associated with the protected zone for interference mitigation, and transmitting the different signal for the different packet using the frequency domain resource allocation that is based at least in part on the length or the size of the different packet.

In a seventh aspect, alone or in combination with one or more of the first through sixth aspects, process 700 includes transmitting one or more retransmissions of a different signal for a different packet based at least in part on a different location of the wireless communication device not being associated with the protected zone for interference mitigation.

In an eighth aspect, alone or in combination with one or more of the first through seventh aspects, process 700 includes transmitting one or more frequency division multiplexed signals based at least in part on a different location of the wireless communication device not being associated with the protected zone for interference mitigation.

In a ninth aspect, alone or in combination with one or more of the first through eighth aspects, the full available frequency domain resource allocation is an available bandwidth for the channel.

In a tenth aspect, alone or in combination with one or more of the first through ninth aspects, the channel is associated with an intelligent transport system (ITS) frequency band.

In an eleventh aspect, alone or in combination with one or more of the first through tenth aspects, the protected zone is associated with a DSRC receiver.

In a twelfth aspect, alone or in combination with one or more of the first through eleventh aspects, the DSRC receiver is a European Committee for Standardization DSRC receiver.

In a thirteenth aspect, alone or in combination with one or more of the first through twelfth aspects, transmitting the signal for the packet includes transmitting a V2X signal for the packet.

In a fourteenth aspect, alone or in combination with one or more of the first through thirteenth aspects, the wireless communication device is at least one of a UE or an OBU.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
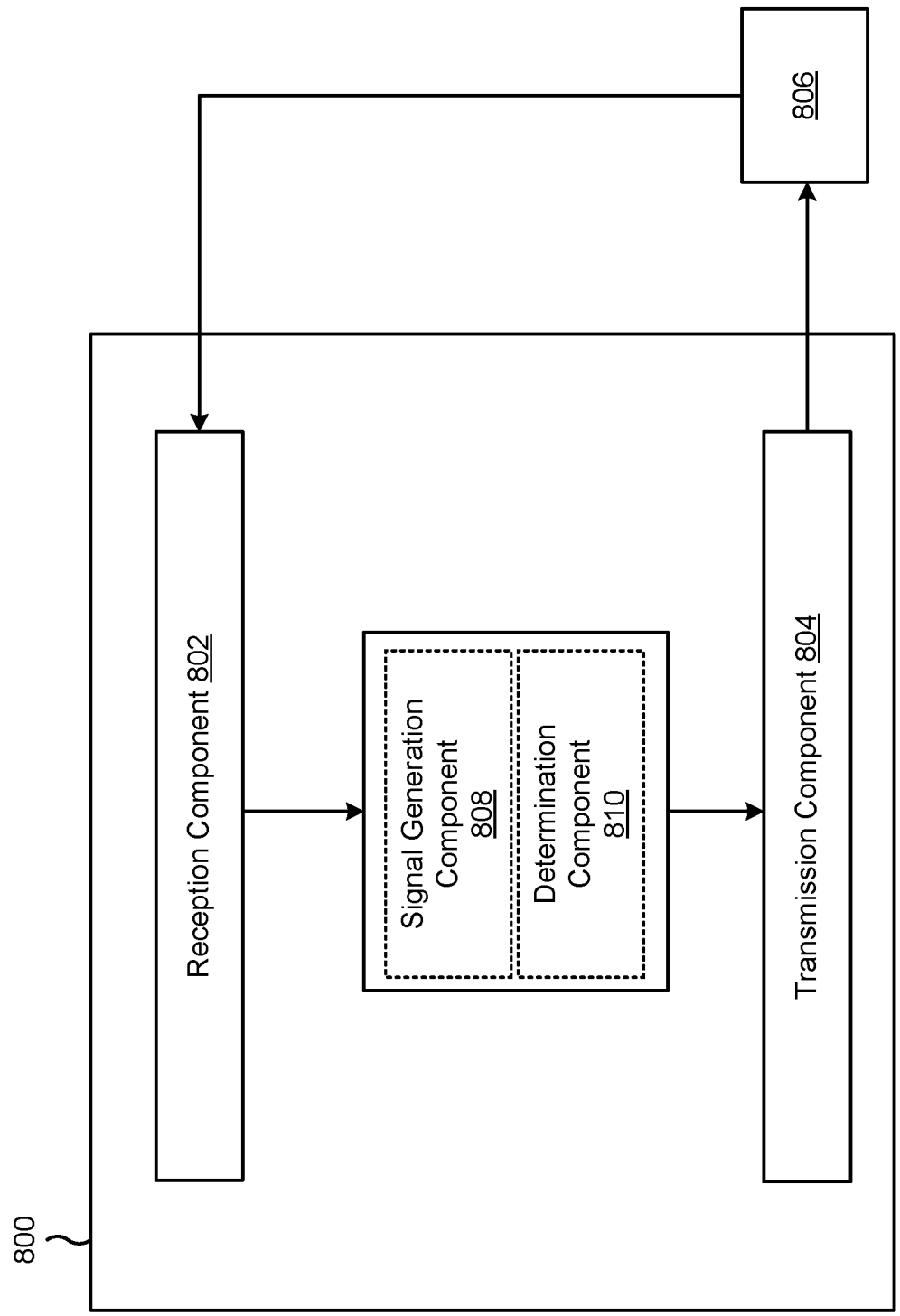
FIG. 8 is a block diagram of an example apparatus for wireless communication, in accordance with the present disclosure.

FIG. 8 is a block diagram of an example apparatus 800 for wireless communication. The apparatus 800 may be a wireless communication device, or a wireless communication device may include the apparatus 800. For example, the apparatus 800 may be a UE, an OBU, or another device. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a signal generation component 808, and/or a determination component 810, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the wireless communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The signal generation component 808 may generate a signal for a packet using a full available frequency domain resource allocation for a channel based at least in part on a location of the wireless communication device being associated with a protected zone for interference mitigation. The transmission component 804 may transmit the signal for the packet using the full available frequency domain resource allocation for the channel.

The determination component 810 may refrain from scheduling retransmissions of the signal based at least in part on the location of the wireless communication device being associated with the protected zone.

The determination component 810 may refrain from transmitting using frequency division multiplexing operations based at least in part on the location of the wireless communication device being associated with the protected zone.

The transmission component 804 may transmit the signal for the packet using a transmit power in accordance with a coexistence mode associated with the protected zone.

The signal generation component 808 may generate the signal for the packet using the full available frequency domain resource allocation for the channel regardless of a length or size of the packet based at least in part on the location of the wireless communication device being associated with the protected zone.

The signal generation component 808 may generate a different signal for a different packet, using a frequency domain resource allocation that is based at least in part on a length or size of the different packet, based at least in part on a different location of the wireless communication device not being associated with the protected zone for interference mitigation. The transmission component 804 may transmit the different signal for the different packet using the frequency domain resource allocation that is based at least in part on the length or the size of the different packet.

The transmission component 804 may transmit one or more retransmissions of a different signal for a different packet based at least in part on a different location of the wireless communication device not being associated with the protected zone for interference mitigation.

The transmission component 804 may transmit one or more frequency division multiplexed signals based at least in part on a different location of the wireless communication device not being associated with the protected zone for interference mitigation.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a wireless communication device, comprising: generating a signal for a packet using a full available frequency domain resource allocation for a channel based at least in part on a location of the wireless communication device being associated with a protected zone for interference mitigation; and transmitting the signal for the packet using the full available frequency domain resource allocation for the channel.

Aspect 2: The method of Aspect 1, further comprising: refraining from scheduling retransmissions of the signal based at least in part on the location of the wireless communication device being associated with the protected zone.

Aspect 3: The method of any of Aspects 1-2, wherein transmitting the signal for the packet comprises: refraining from transmitting using frequency division multiplexing operations based at least in part on the location of the wireless communication device being associated with the protected zone.

Aspect 4: The method of any of Aspects 1-3, wherein transmitting the signal for the packet comprises: transmitting the signal for the packet using a transmit power in accordance with a coexistence mode associated with the protected zone.

Aspect 5: The method of any of Aspects 1-4, wherein transmitting the signal for the packet using the full available frequency domain resource allocation for the channel enables the wireless communication device to operate in accordance with a first coexistence mode associated with the protected zone that has a lower emissions threshold than a second coexistence mode associated with the protected zone.

Aspect 6: The method of any of Aspects 1-5, wherein generating the signal for the packet comprises: generating the signal for the packet using the full available frequency domain resource allocation for the channel regardless of a length or size of the packet based at least in part on the location of the wireless communication device being associated with the protected zone.

Aspect 7: The method of any of Aspects 1-6, further comprising: generating a different signal for a different packet, using a frequency domain resource allocation that is based at least in part on a length or size of the different packet, based at least in part on a different location of the wireless communication device not being associated with the protected zone for interference mitigation; and transmitting the different signal for the different packet using the frequency domain resource allocation that is based at least in part on the length or the size of the different packet.

Aspect 8: The method of any of Aspects 1-7, further comprising: transmitting one or more retransmissions of a different signal for a different packet based at least in part on a different location of the wireless communication device not being associated with the protected zone for interference mitigation.

Aspect 9: The method of any of Aspects 1-8, further comprising: transmitting one or more frequency division multiplexed signals based at least in part on a different location of the wireless communication device not being associated with the protected zone for interference mitigation.

Aspect 10: The method of any of Aspects 1-9, wherein the full available frequency domain resource allocation is an available bandwidth for the channel.

Aspect 11: The method of any of Aspects 1-10, wherein the channel is associated with an intelligent transport system (ITS) frequency band.

Aspect 12: The method of any of Aspects 1-11, wherein the protected zone is associated with a dedicated short-range communications (DSRC) receiver.

Aspect 13: The method of Aspect 12, wherein the DSRC receiver is a European Committee for Standardization (CEN) DSRC receiver.

Aspect 14: The method of any of Aspects 1-13, wherein transmitting the signal for the packet comprises: transmitting a vehicle-to-everything (V2X) signal for the packet.

Aspect 15: The method of any of Aspects 1-14, wherein the wireless communication device is at least one of a user equipment (UE) or an onboard unit (OBU).

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   generating a signal for a packet using a frequency domain resource allocation for a channel based at least in part on whether a location of the wireless communication device is within, or within a threshold distance of, a protected zone for interference mitigation, wherein the frequency domain resource allocation corresponds to a full available frequency domain resource allocation regardless of a length or size of the packet based at least in part on the location of the wireless communication device being within, or within the threshold distance of, the protected zone for interference mitigation,
    wherein the full available frequency domain resource allocation for the channel corresponds to a maximum bandwidth that the wireless communication device is enabled to occupy, and
wherein the frequency domain resource allocation corresponds to a portion of the full available frequency domain resource allocation for the channel based at least in part on the location of the wireless communication device not being within, or within the threshold distance of, the protected zone,
    wherein the portion of the full available frequency domain resource allocation for the channel is less than the fully available frequency domain resource allocation for the channel and
    wherein the portion of the full available frequency domain resource allocation for the channel is determined based at least in part on the length or the size of the packet; and
transmitting the signal for the packet using the frequency domain resource allocation for the channel.

2. The method of claim 1, further comprising:
scheduling retransmissions of the signal based at least in part on the location of the wireless communication device not being within, or within the threshold distance of, the protected zone, wherein the retransmissions of the signal are not scheduled when the location of the wireless communication device is within, or within the threshold distance of, the protected zone.

3. The method of claim 1, wherein transmitting the signal for the packet comprises:
transmitting the signal for the packet using frequency division multiplexing operations based at least in part on the location of the wireless communication device not being within, or within the threshold distance of, the protected zone, wherein the signal for the packet is not transmitted using the frequency division multiplexing operations when the location of the wireless communication device is within, or within the threshold distance of, the protected zone.

4. The method of claim 1, wherein transmitting the signal for the packet comprises:
transmitting, based at least in part on the location of the wireless communication device being within, or within the threshold distance of, the protected zone, the signal for the packet, wherein the signal for the packet is transmitted using a transmit power in accordance with a coexistence mode associated with the protected zone.

5. The method of claim 1, wherein transmitting the signal for the packet using the full available frequency domain resource allocation for the channel enables the wireless communication device to operate in accordance with a first coexistence mode associated with the protected zone that has a lower emissions threshold than a second coexistence mode associated with the protected zone.

6. The method of claim 1, further comprising:
disabling or restricting retransmissions of signals based at least in part on the location of the wireless communication device being within, or within the threshold distance of, the protected zone.

7. The method of claim 1, further comprising:
generating a different signal for a different packet, using a frequency domain resource allocation that is based at least in part on a length or size of the different packet, when a different location of the wireless communication device is not within, or within the threshold distance of, the protected zone for interference mitigation; and
transmitting the different signal for the different packet using the frequency domain resource allocation that is based at least in part on the length or the size of the different packet.

8. The method of claim 1, further comprising:
transmitting one or more retransmissions of a different signal for a different packet based at least in part on a different location of the wireless communication device not being within, or within the threshold distance of, the protected zone for interference mitigation.

9. The method of claim 1, further comprising:
transmitting one or more frequency division multiplexed signals based at least in part on a different location of the wireless communication device not being within, or within the threshold distance of, the protected zone for interference mitigation.

10. The method of claim 1, wherein transmitting the signal for the packet comprises:
transmitting a vehicle-to-everything (V2X) signal for the packet.

11. The method of claim 1, wherein the channel is associated with an intelligent transport system (ITS) frequency band.

12. The method of claim 1, wherein the protected zone is associated with a dedicated short-range communications (DSRC) receiver.

13. A wireless communication device for wireless communication, comprising:
one or more memories; and
one or more processors, coupled to the one or more memories, configured to:
    generate a signal for a packet using a frequency domain resource allocation for a channel based at least in part on whether a location of the wireless communication device is within, or within a threshold distance of, a protected zone for interference mitigation,
        wherein the frequency domain resource allocation corresponds to a full available frequency domain resource allocation regardless of a length or size of the packet based at least in part on the location of the wireless communication device being within, or within the threshold distance of, the protected zone for interference mitigation,
        wherein the full available frequency domain resource allocation for the channel corresponds to a maximum bandwidth that the wireless communication device is enabled to occupy, and
        wherein the frequency domain resource allocation corresponds to a portion of the full available frequency domain resource allocation for the channel based at least in part on the location of the wireless communication device not being within, or within the threshold distance of, the protected zone,
            wherein the portion of the full available frequency domain resource allocation for the channel is less than the fully available frequency domain resource allocation for the channel, and wherein the portion of the full available frequency domain resource allocation for the channel is determined based at least in part on the length or the size of the packet; and transmit the signal for the packet using the frequency domain resource allocation for the channel.

14. The wireless communication device of claim 13, wherein the one or more processors are further configured to:

disable or restrict retransmissions of signals based at least in part on the location of the wireless communication device being within, or within the threshold distance of, the protected zone.

15. The wireless communication device of claim 13, wherein the one or more processors are further configured to:

schedule retransmissions of the signal based at least in part on the location of the wireless communication device not being within, or within the threshold distance of, the protected zone, wherein the retransmissions of the signal are not scheduled when the location of the wireless communication device is within, or within the threshold distance of, the protected zone.

16. The wireless communication device of claim 13, wherein the one or more processors, to transmit the signal for the packet, are configured to:

transmit the signal for the packet using frequency division multiplexing operations based at least in part on the location of the wireless communication device not being within, or within the threshold distance of, the protected zone, wherein the signal for the packet is not transmitted using the frequency division multiplexing operations when the location of the wireless communication device is within, or within the threshold distance of, the protected zone.

17. The wireless communication device of claim 13, wherein the one or more processors, to transmit the signal for the packet, are configured to:

transmit, based at least in part on the location of the wireless communication device being within, or within the threshold distance of, the protected zone, the signal for the packet, wherein the signal for the packet is transmitted using a transmit power in accordance with a coexistence mode associated with the protected zone.

18. The wireless communication device of claim 13, wherein transmitting the signal for the packet using the full available frequency domain resource allocation for the channel enables the wireless communication device to operate in accordance with a first coexistence mode associated with the protected zone that has a lower emissions threshold than a second coexistence mode associated with the protected zone.

19. The wireless communication device of claim 13, wherein the one or more processors, to transmit the signal for the packet, are configured to:

transmit a vehicle-to-everything (V2X) signal for the packet.

20. The wireless communication device of claim 13, wherein the one or more processors are further configured to:

generate a different signal for a different packet, using a frequency domain resource allocation that is based at least in part on a length or size of the different packet, based at least in part on a different location of the wireless communication device not being within, or within the threshold distance of, the protected zone for interference mitigation; and transmit the different signal for the different packet using the frequency domain resource allocation that is based at least in part on the length or the size of the different packet.

21. The wireless communication device of claim 13, wherein the one or more processors are further configured to:

transmit one or more retransmissions of a different signal for a different packet based at least in part on a different location of the wireless communication device not being within, or within the threshold distance of, the protected zone for interference mitigation.

22. The wireless communication device of claim 13, wherein the one or more processors are further configured to:

transmit one or more frequency division multiplexed signals based at least in part on a different location of the wireless communication device not being within, or within the threshold distance of, the protected zone for interference mitigation.

23. The wireless communication device of claim 13, wherein the protected zone is associated with a dedicated short-range communications (DSRC) receiver.

24. The wireless communication device of claim 13, wherein the channel is associated with an intelligent transport system (ITS) frequency band.

25. A non-transitory computer-readable medium storing a set of instructions for wireless communication, the set of instructions comprising:

one or more instructions that, when executed by one or more processors of a wireless communication device, cause the wireless communication device to:

generate a signal for a packet using a frequency domain resource allocation for a channel based at least in part on whether a location of the wireless communication device is within, or within a threshold distance of, a protected zone for interference mitigation, wherein the frequency domain resource allocation corresponds to a full available frequency domain resource allocation regardless of a length or size of the packet based at least in part on the location of the wireless communication device being within, or within the threshold distance of, the protected zone for interference mitigation, wherein the full available frequency domain resource allocation for the channel corresponds to a maximum bandwidth that the wireless communication device is enabled to occupy, and wherein the frequency domain resource allocation corresponds to a portion of the full available frequency domain resource allocation for the channel based at least in part on the location of the wireless communication device not being within, or within the threshold distance of, the protected zone, wherein the portion of the full available frequency domain resource allocation for the channel is less than the fully available frequency domain resource allocation for the channel, and wherein the portion of the full available frequency domain resource allocation for the channel is determined based at least in part on the length or the size of the packet; and transmit the signal for the packet using the frequency domain resource allocation for the channel.

26. The non-transitory computer-readable medium of claim 25, wherein the one or more instructions further cause the wireless communication device to:

schedule retransmissions of the signal based at least in part on the location of the wireless communication device not being within, or within the threshold distance of, the protected zone, wherein the retransmissions of the signal are not scheduled when the location of the wireless communication device is within, or within the threshold distance of, the protected zone.

27. The non-transitory computer-readable medium of claim 25, wherein the one or more instructions further cause the wireless communication device to:

transmit the signal for the packet using frequency division multiplexing operations based at least in part on the location of the wireless communication device not being within, or within the threshold distance of, the protected zone, wherein the signal for the packet is not transmitted using the frequency division multiplexing operations when the location of the wireless communication device is within, or within the threshold distance of, the protected zone.

28. An apparatus for wireless communication, comprising:

means for generating a signal for a packet using a frequency domain resource allocation for a channel based at least in part on whether a location of the apparatus is within, or within a threshold distance of, a protected zone for interference mitigation, wherein the frequency domain resource allocation corresponds to a full available frequency domain resource allocation regardless of a length or a size of the packet based at least in part on the location of the apparatus being within, or within the threshold distance of, the protected zone for interference mitigation, wherein the full available frequency domain resource allocation for the channel corresponds to a maximum bandwidth that the apparatus is enabled to occupy, and wherein the frequency domain resource allocation corresponds to a portion of the full available frequency domain resource allocation for the channel based at least in part on the location of the apparatus not being within, or within the threshold distance of, the protected zone, wherein the portion of the full available frequency domain resource allocation for the channel is less than the fully available frequency domain resource allocation for the channel, and wherein the portion of the full available frequency domain resource allocation for the channel is determined based at least in part on the length or the size of the packet; and means for transmitting the signal for the packet using the frequency domain resource allocation for the channel.

29. The apparatus of claim 28, further comprising:

means for transmitting the signal for the packet using frequency division multiplexing operations based at least in part on the location of the apparatus not being within, or within the threshold distance of, the protected zone, wherein the signal for the packet is not transmitted using the frequency division multiplexing operations when the location of the wireless communication device is within, or within the threshold distance of, the protected zone.

30. The apparatus of claim 28, further comprising:

means for scheduling retransmissions of the signal based at least in part on the location of the apparatus not being within, or within the threshold distance of, the protected zone, wherein the retransmissions of the signal are not scheduled when the location of the apparatus is within, or within the threshold distance of, the protected zone.

* * * * *